(12) United States Patent
Wiens-Kind et al.

(10) Patent No.: US 11,708,989 B2
(45) Date of Patent: Jul. 25, 2023

(54) BUILDING MANAGEMENT SYSTEM WITH GRAPHIC USER INTERFACE FOR COMPONENT OPERATIONAL EFFICIENCY

(71) Applicant: Johnson Controls Technology Company, Auburn Hills, MI (US)

(72) Inventors: Garrett Wiens-Kind, Milwaukee, WI (US); Dimitrios S. Papadopoulos, Westwood, NJ (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/084,264

(22) Filed: Oct. 29, 2020

(65) Prior Publication Data

US 2021/0239347 A1 Aug. 5, 2021

Related U.S. Application Data

(60) Provisional application No. 62/968,866, filed on Jan. 31, 2020.

(51) Int. Cl.
*F24F 11/52* (2018.01)
*G05B 13/02* (2006.01)
(Continued)

(52) U.S. Cl.
CPC .............. *F24F 11/52* (2018.01); *F24F 11/30* (2018.01); *F24F 11/56* (2018.01); *F24F 11/58* (2018.01);
(Continued)

(58) Field of Classification Search
CPC .. F24F 11/52; F24F 11/64; F24F 11/30; F24F 11/56; F24F 11/61; F24F 11/65;
(Continued)

(56) References Cited

U.S. PATENT DOCUMENTS 9,299,029 B1 3/2016 Kim
9,447,985 B2 9/2016 Johnson
(Continued)

FOREIGN PATENT DOCUMENTS

CA 2957726 A1 3/2016
CA 3043996 A1 2/2018
(Continued)

OTHER PUBLICATIONS

U.S. Appl. No. 16/549,037, filed Aug. 23, 2019, Johnson Controls Technology Company.
(Continued)

*Primary Examiner* — Charles R Kasenge
(74) *Attorney, Agent, or Firm* — Foley & Lardner LLP

(57) ABSTRACT

A building management system includes a building efficiency improvement system and method configured to monitor and control subsystems and equipment for improved efficiency of operation. A user device is configured to display a user interface for monitoring and controlling one or more building equipment efficiency parameters and settings. The building efficiency management system further includes a controller configured to collect and analyze data from equipment, generate displays of the operational status and efficiency levels, generate sets of alternative equipment control algorithms based on efficiency objectives, and present users with a set of alternative equipment control algorithms displayed via graphic user interface elements on the user device. The user device further provides a means to select and implement an alternate equipment control algorithm. The controller is further configured to receive inputs from the user device commanding changes to equipment controls and process transactions associated with changes to equipment configuration.

20 Claims, 14 Drawing Sheets

(51) Int. Cl.

| | | |
|---|---|---|
| *F24F 11/58* | (2018.01) | |
| *G06Q 20/10* | (2012.01) | |
| *F24F 11/65* | (2018.01) | |
| *F24F 11/64* | (2018.01) | |
| *F24F 11/30* | (2018.01) | |
| *F24F 11/56* | (2018.01) | |
| *F24F 11/61* | (2018.01) | |
| *G05B 13/04* | (2006.01) | |
| *F24F 110/20* | (2018.01) | |
| *F24F 140/60* | (2018.01) | |
| *F24F 120/20* | (2018.01) | |
| *F24F 120/12* | (2018.01) | |
| *F24F 110/10* | (2018.01) | |

(52) U.S. Cl.
CPC .............. *F24F 11/61* (2018.01); *F24F 11/64* (2018.01); *F24F 11/65* (2018.01); *G05B 13/024* (2013.01); *G05B 13/0265* (2013.01); *G05B 13/048* (2013.01); *G06Q 20/102* (2013.01); *F24F 2110/10* (2018.01); *F24F 2110/20* (2018.01); *F24F 2120/12* (2018.01); *F24F 2120/20* (2018.01); *F24F 2140/60* (2018.01)

(58) Field of Classification Search
CPC .... F24F 11/58; F24F 2110/20; F24F 2140/60; F24F 2120/20; F24F 2120/12; F24F 2110/10; G05B 13/0265; G05B 13/048; G05B 13/024; G05B 15/02; G05B 2219/2614; G06Q 20/102
See application file for complete search history.

(56) References Cited

U.S. PATENT DOCUMENTS

| | | | |
|---|---|---|---|
| 10,177,930 B1* | 1/2019 | Bodkin | H04L 12/28 |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2003/0019944 A1* | 1/2003 | Nonaka | F24F 11/30 62/190 |
| 2011/0184565 A1 | 7/2011 | Peterson | |
| 2013/0185079 A1* | 7/2013 | Park | D06F 34/05 340/3.7 |
| 2015/0308708 A1* | 10/2015 | Harada | F24F 11/30 700/276 |
| 2016/0018832 A1* | 1/2016 | Frank | F24F 11/62 700/276 |
| 2018/0306459 A1 | 10/2018 | Turney | |
| 2018/0313557 A1 | 11/2018 | Turney et al. | |
| 2018/0364654 A1 | 12/2018 | Locke et al. | |
| 2018/0372363 A1 | 12/2018 | Park et al. | |
| 2019/0041811 A1 | 2/2019 | Drees | |
| 2019/0123931 A1 | 4/2019 | Schuster et al. | |
| 2019/0293494 A1 | 9/2019 | Mao et al. | |
| 2019/0338973 A1 | 11/2019 | Turney et al. | |
| 2019/0338974 A1 | 11/2019 | Turney et al. | |
| 2019/0338977 A1 | 11/2019 | Turney et al. | |
| 2019/0353377 A1 | 11/2019 | Mao et al. | |
| 2019/0353775 A1 | 11/2019 | Kirsch et al. | |
| 2019/0354071 A1 | 11/2019 | Turney et al. | |
| 2019/0377305 A1 | 12/2019 | Petrus et al. | |
| 2019/0378020 A1 | 12/2019 | Camilus et al. | |
| 2019/0384239 A1 | 12/2019 | Murugesan et al. | |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

U.S. Appl. No. 16/549,656, filed Aug. 23, 2019, Johnson Controls Technology Company.
U.S. Appl. No. 16/549,744, filed Aug. 23, 2019, Johnson Controls Technology Company.
U.S. Appl. No. 16/598,635, filed Oct. 10, 2019, Johnson Controls Technology Company.
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System-Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from Internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-

(56) References Cited

OTHER PUBLICATIONS

Automation-Clawson-Manor-2-lmages.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

FIG. 13

BUILDING MANAGEMENT SYSTEM WITH GRAPHIC USER INTERFACE FOR COMPONENT OPERATIONAL EFFICIENCY

CROSS-REFERENCE TO RELATED PATENT APPLICATIONS

This application claims the benefit of and priority to, under 35 U.S.C. § 119(e), U.S. Provisional Patent Application 62/968,866, filed Jan. 31, 2020, entitled "METASYS 11," the entire contents of which is incorporated herein by reference.

BACKGROUND

The present disclosure relates generally to a system for and method of viewing information relating to a building management system and selecting control options components of building management systems. A building management system (BMS) is, in general, a system of devices configured to control, monitor, and manage equipment in or around a building or building area. A BMS can include, for example, a heating, ventilation, or air conditioning (HVAC) system, a security system, a lighting system, a fire alerting system, any other system that is capable of managing building functions or devices, or any combination thereof.

Information about operation of components of the BMS is typically collected by the BMS and presented to a user via a user interface generated by the BMS. A user may access the user interface via a user device such as a desktop, laptop, tablet, or mobile device. The user may generally access information about one or more spaces within the BMS, or one or more equipment within the BMS by navigating to the space or equipment via a graphic user interface generated by the BMS. For example, a user may view the current status of an area (e.g., occupancy, temperature, etc.), the current status of equipment (e.g., if equipment requires maintenance or replacement, if the equipment is malfunctioning), or any alarms or warning relating to the building or BMS. The BMS may provide information on equipment status, condition, faults, and operational efficiency.

The equipment under the control of a BMS may be operating in a manner whose efficiency may be improved by modifying or replacing the equipment control algorithm. For example, equipment operational data collected and analyzed by the BMS may be determined by the BMS to be outside parameters established for desired efficiency in operation of the equipment. Accordingly, it would be desirable to have systems and methods for generating a user interface that indicates the operational status and level of efficiency of BMS controlled equipment and provides a user options and means to select, purchase, download, install, and monitor an alternate equipment control algorithm identified by the systems or methods as having an increased probability of improving equipment operational efficiency.

SUMMARY

One implementation of the present disclosure relates to a building management system. The building management system (BMS) includes building equipment configured to serve one or more spaces in a building or campus. The equipment controlled by the BMS may include heating, ventilation, and air conditioning (HVAC) equipment. The building management system comprises a building efficiency management system. The building efficiency management system comprises a controller. The controller is configured to collect and analyze data from equipment controlled by the BMS. The controller is further configured to determine whether BMS controlled equipment is operating normally and efficiently based on comparison of equipment operational data and other factors stored or recorded by the BMS. The controller is further configured to determine the algorithm currently being used to control a unit of equipment. The controller is further configured to identify at least one of a set of alternative equipment control algorithms available through the BMS or from other platforms connected to the BMS. The controller is further configured to generate a graphic user interface (GUI) for selecting equipment, displaying equipment operational status, and highlighting faults or inefficiencies in equipment operation. The controller is further configured to identify the control algorithm currently implemented for a unit of equipment and present, via the GUI, alternative control algorithms determined by the building efficiency management system to have an increased probability of restoring equipment to normal operation or improving equipment operating efficiency. The controller is further configured to enable a user to command replacement of a current equipment control algorithm with a new algorithm selected from the set of alternative control algorithms presented via the GUI.

Another implementation of the present disclosure relates to a building management system. The building management system includes building equipment configured to serve one or more spaces in a building or campus. The building management system further includes a user device configured to display a selected user interface for monitoring and controlling the building equipment and the one or more spaces. The building management system further includes a building efficiency management system configured to collect and analyze data from equipment controlled by the BMS, determine the operational status and efficiency level of BMS controlled equipment, generate displays of the operational status and efficiency level of BMS controlled equipment, generate sets of alternative equipment control algorithms based on factors including efficiency objectives, and present users with a set of alternative equipment control algorithms and a means to select and implement an alternate algorithm via the GUI. The controller is further configured to determine if the selection of an alternate algorithm requires a purchase transaction and to execute the transaction via a transaction module within the controller. The transaction module within the control is in communication with applications and platforms connected to the BMS. The controller is further configured to collect and analyze data from a unit of equipment following replacement of its control algorithm by an alternate algorithm selected via the GUI. The controller is further configured to determine the operational efficiency of the unit of equipment over time and generate a display of changes in operational efficiency over time via the GUI. The controller is further configured to calculate a cost savings over time resulting from a change in an equipment control algorithm.

Another implementation of the present disclosure relates to a method for configuring and implementing a user interface to be displayed on a user device, the user interface configured to display information related to monitoring and controlling of building equipment and spaces in a building management system. The method includes collecting and analyzing data from equipment controlled by the BMS, determining the operational status and efficiency level of BMS controlled equipment, generating displays of the operational status and efficiency level of BMS controlled equipment, generating sets of alternative equipment control algorithms based on factors including efficiency objectives, and presenting users with a set of alternative equipment control algorithms and a means to select and implement an alternate algorithm via the GUI. The method further includes determining if the selection of an alternate algorithm is a purchase transaction and executing the transaction. The method further includes collecting and analyzing data from a unit of equipment following replacement of its control algorithm by an alternate algorithm selected via the GUI. The method further includes determining the operational efficiency of the unit of equipment over time and generate a display of changes in operational efficiency over time via the GUI. The method further includes to calculating cost savings over time resulting from a change in an equipment control algorithm.

BRIEF DESCRIPTION OF THE DRAWINGS

FIG. 13 is drawing of a configuration interface to create a user interface for displaying equipment status, selecting an alternate equipment control algorithm, and depicting resulting cost savings, according to some embodiments

DETAILED DESCRIPTION

Figure 1:
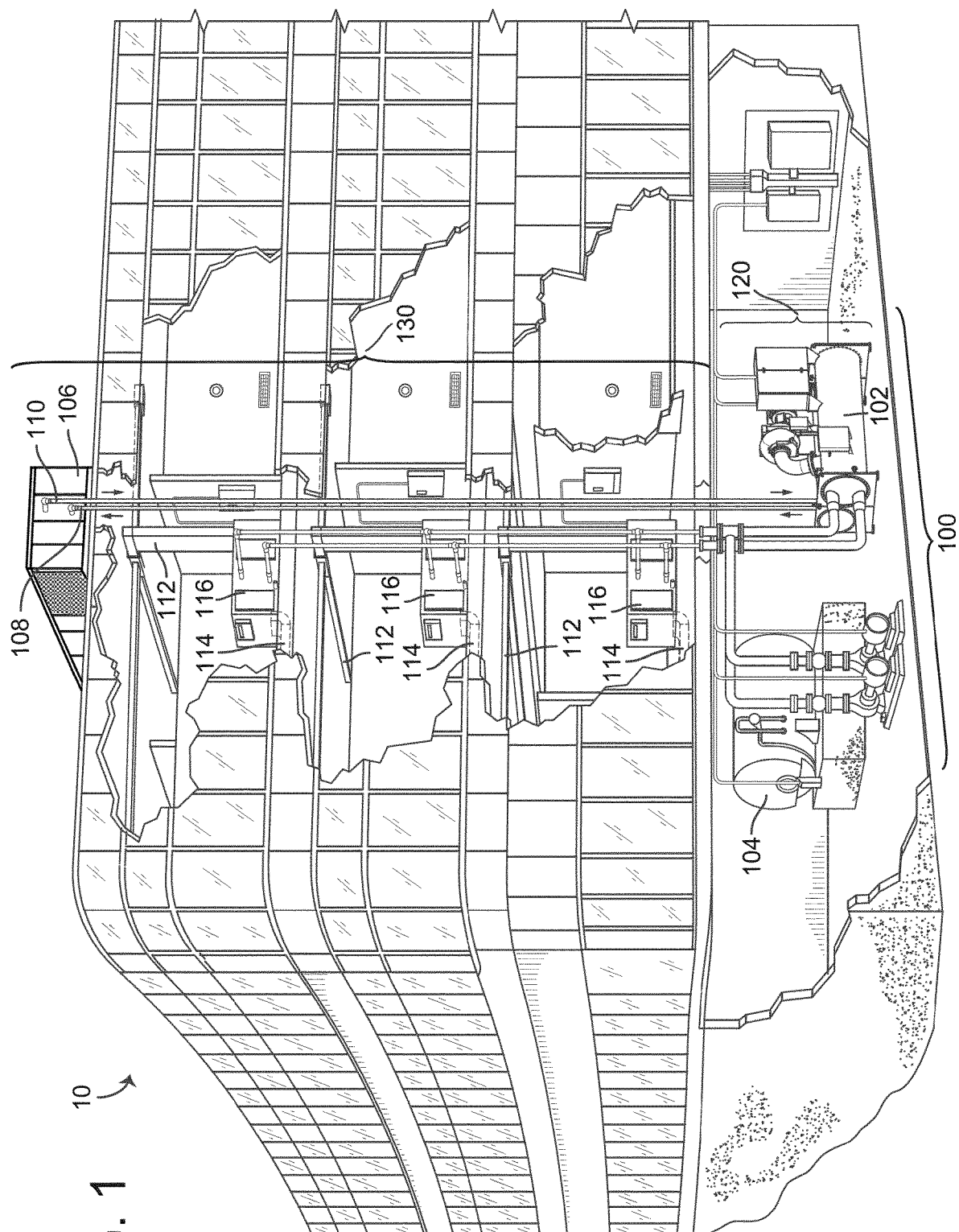
FIG. 1 is drawing of a building equipped with a building management system (BMS) and a HVAC system, according to some embodiments.

Referring generally to the figures, systems and methods for viewing information relating to a building management system and generating a graphic user interface display for selecting equipment control options for improved efficiency are described, according to an exemplary embodiment. The graphic user interface is generally a menu list interface that alerts users of issues related to BMS controlled HVAC equipment operational status and efficiency. The user interface provides control algorithm recommendations for improved efficiency of equipment operation. The user can act on such algorithm recommendations and update various settings of the BMS through the user interface. This functionality allows users to easily assess and improve operation and performance. The functionality warns the user of faults and sub-optimal operation of equipment controlled by the BMS system. The graphic user interface view may generally include a user interface with a layout. The layout includes one or more widget, each widget corresponding with a particular building area, equipment, building system (e.g., a group of like equipment in the building), or task. Widgets may be associated with all equipment controlled by a BMS, or to a subset of components or functions within a BMS. The layout may define how each widget is displayed in the user interface (e.g., the size, shape, and format of each widget), as well as which widgets are viewable for a particular user (or viewable by all users).

The presently disclosed embodiments provide a graphical user interface for viewing information relating to a BMS and selecting control options for improvement of operational efficiency of components of BMS. In some embodiments, a snap-shot view brings together, in one summary window, issues related to the operational status and efficiency of BMS controlled building systems and equipment and assigned assets. BMS controlled building systems and equipment and assigned assets may include but are not limited to, for example, HVAC equipment, lighting, security systems, safety systems, power systems, transportation systems, and personnel. A user can access the snap-shot view via a user interface and easily change configuration settings of various BMS controlled HVAC equipment based on information in the summary window. The user can change the control algorithms and control settings by viewing an issue determination indication and summary of algorithm selection recommendations displayed on the user interface and selecting an option to change the equipment control algorithm based on the policy recommendation. Each selection can be easily made from the summary window via drop down menus. This functionality may provide advantages in ease and speed of navigating and/or changing control and algorithm settings of various BMS controlled HVAC equipment.

In some embodiments, a building efficiency management system may receive data from an equipment status application of the building management system for equipment relevant to the user (e.g., areas or equipment for which the user has maintenance responsibility), and provide relevant information about the equipment via the graphic user display. For example, the building efficiency management system may determine that particular equipment for which the user has responsibility is in a fault status.

Building Management System and HVAC System

Figure 2:
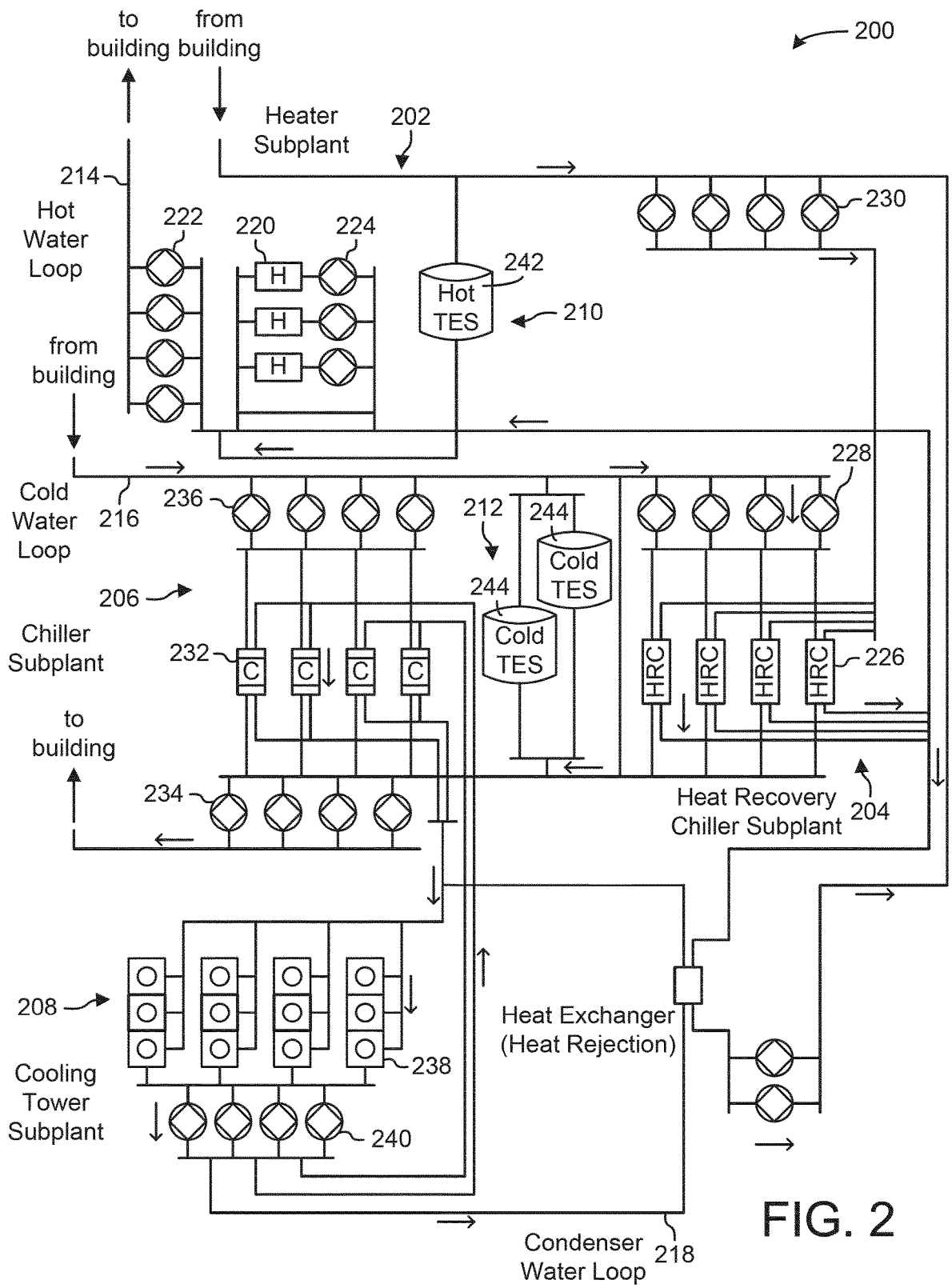
FIG. 2 is a block diagram of a waterside system which can be used as part of the HVAC system of FIG. 1, according to some embodiments.
Figure 3:
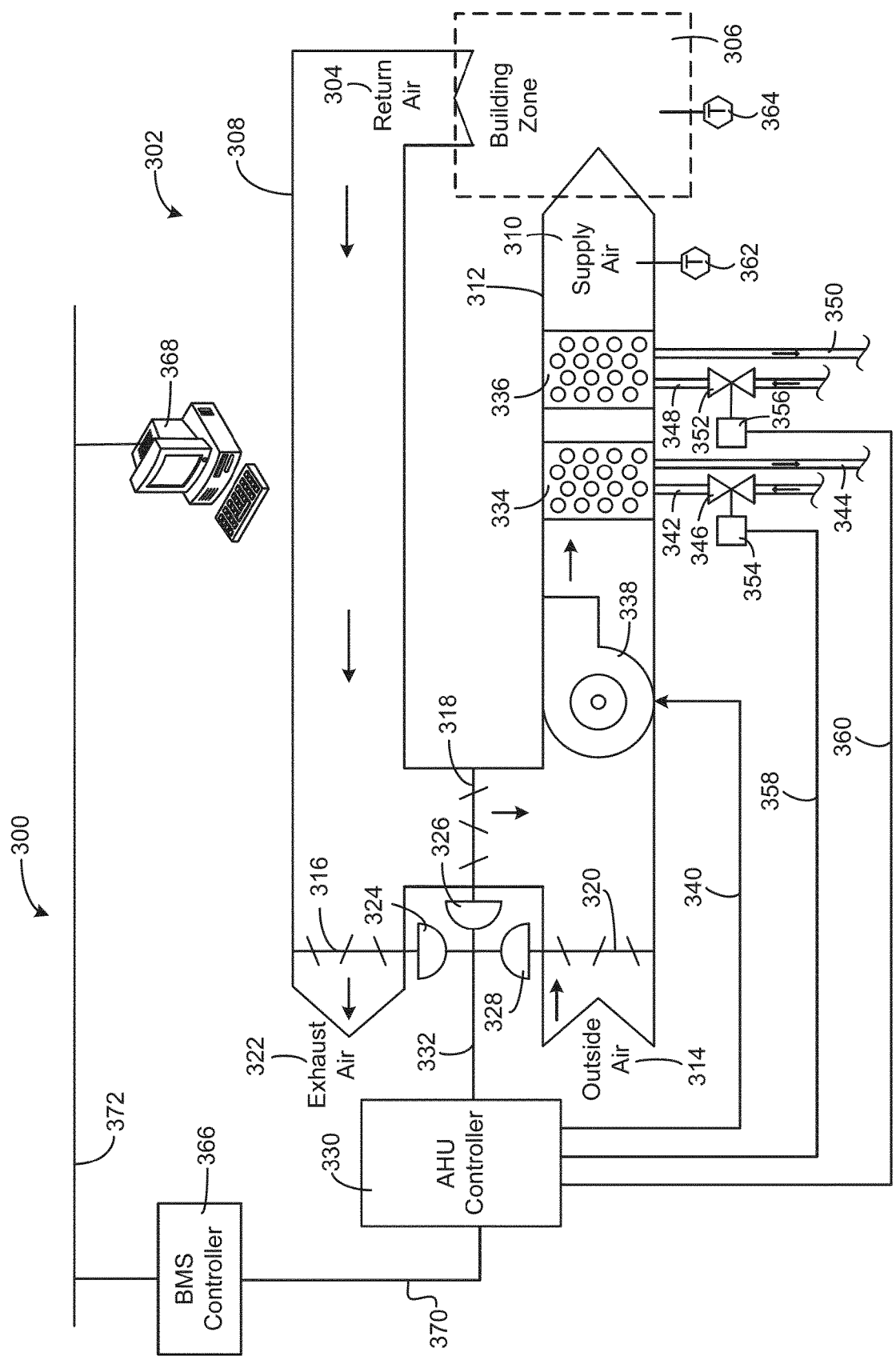
FIG. 3 is a block diagram of an airside system which can be used as part of the HVAC system of FIG. 1, according to some embodiments.
Figure 4:
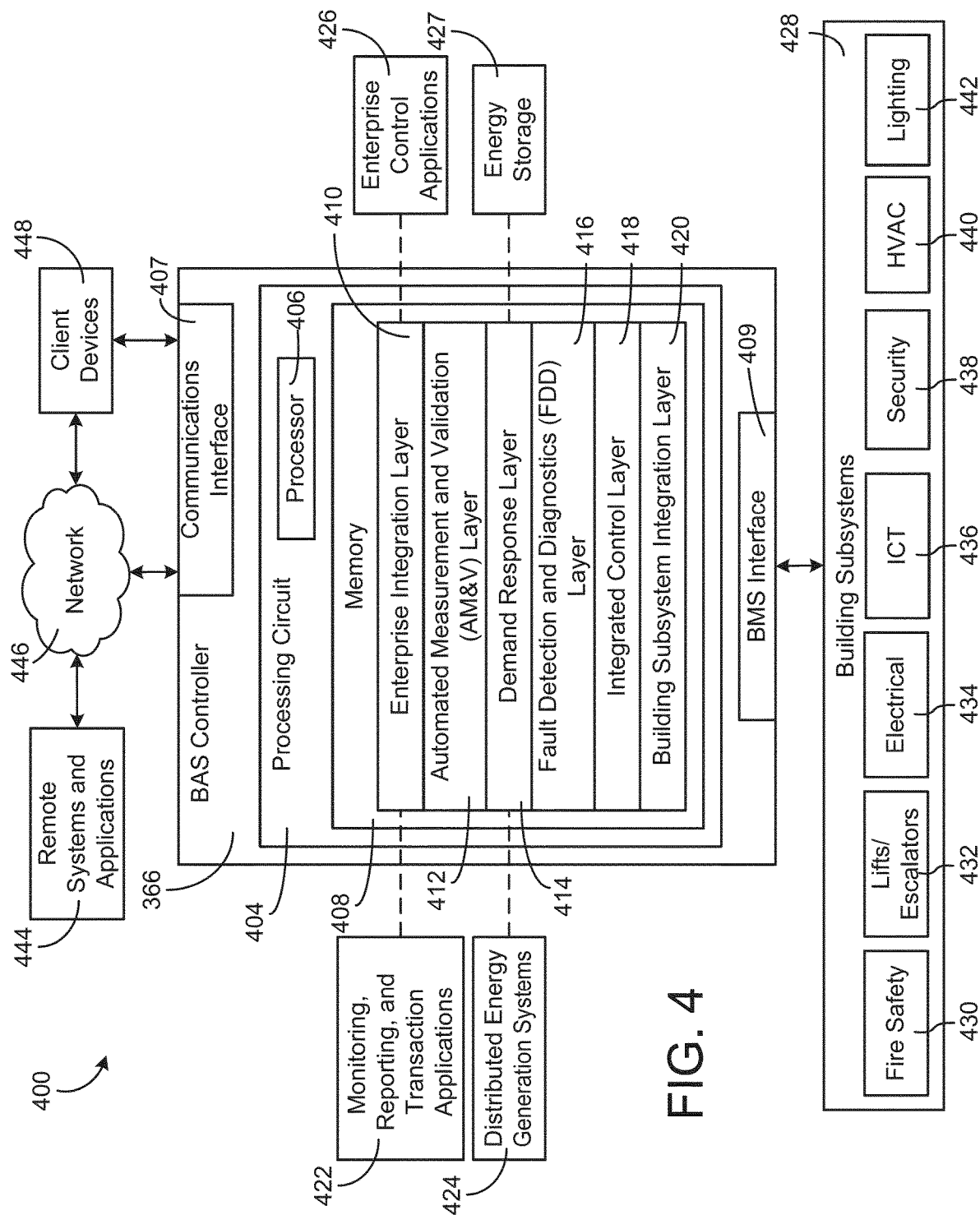
FIG. 4 is a block diagram of a BMS which can be used in the building of FIG. 1, according to some embodiments.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area interconnected by a Local Area Network (LAN). A BMS can include, for example, an HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

In some embodiments, HVAC system 100 uses free cooling to cool the working fluid. For example, HVAC system 100 can include one or more cooling towers or heat exchangers which transfer heat from the working fluid to outside air. Free cooling can be used as an alternative or supplement to mechanical cooling via chiller 102 when the temperature of the outside air is below a threshold temperature. HVAC system 100 can switch between free cooling and mechanical cooling based on the current temperature of the outside air and/or the predicted future temperature of the outside air.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 108.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, waterside system 200 uses free cooling to cool the water in cold water loop 216. For example, the water returning from the building in cold water loop 216 can be delivered to cooling tower subplant 208 and through cooling towers 238. Cooling towers 238 can remove heat from the water in cold water loop 216 (e.g., by transferring the heat to outside air) to provide free cooling for the water in cold water loop 216. In some embodiments, waterside system 200 switches between free cooling with cooling tower subplant 208 and mechanical cooling with chiller subplant 206 based on the current temperature of the outside air and/or the predicted future temperature of the outside air. An example of a free cooling system which can be used in waterside system 200 is described in greater detail with reference to FIG. 6.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

In some embodiments, AHU controller 330 uses free cooling to cool supply air 310. AHU controller 330 can switch between free cooling and mechanical cooling by operating outside air damper 320 and cooling coil 334. For example, AHU controller 330 can deactivate cooling coil 334 and open outside air damper 320 to allow outside air 314 to enter supply air duct 312 in response to a determination that free cooling is economically optimal. AHU controller 330 can determine whether free cooling is economically optimal based on the temperature of outside air 314 and/or the predicted future temperature of outside air 314. For example, AHU controller 330 can determine whether the temperature of outside air 314 is predicted to be below a threshold temperature for a predetermined amount of time. An example of free cooling switching logic which can be used by AHU controller 330 is described in greater detail with reference to FIG. 10.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372 (e.g., a LAN).

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 is shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, LAN, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408). BMS controller 366 is a thermostat (e.g., smart thermostat) in some embodiments.

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the building subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics (FDD) layer 416 and automated measurement and validation layer AM&V) 412. Integrated control layer 418 can be configured to provide calculated inputs (e.g., aggregations) to these higher levels based on outputs from more than one building subsystem.

AM&V layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

FDD layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Efficiency Management System

Figure 5:
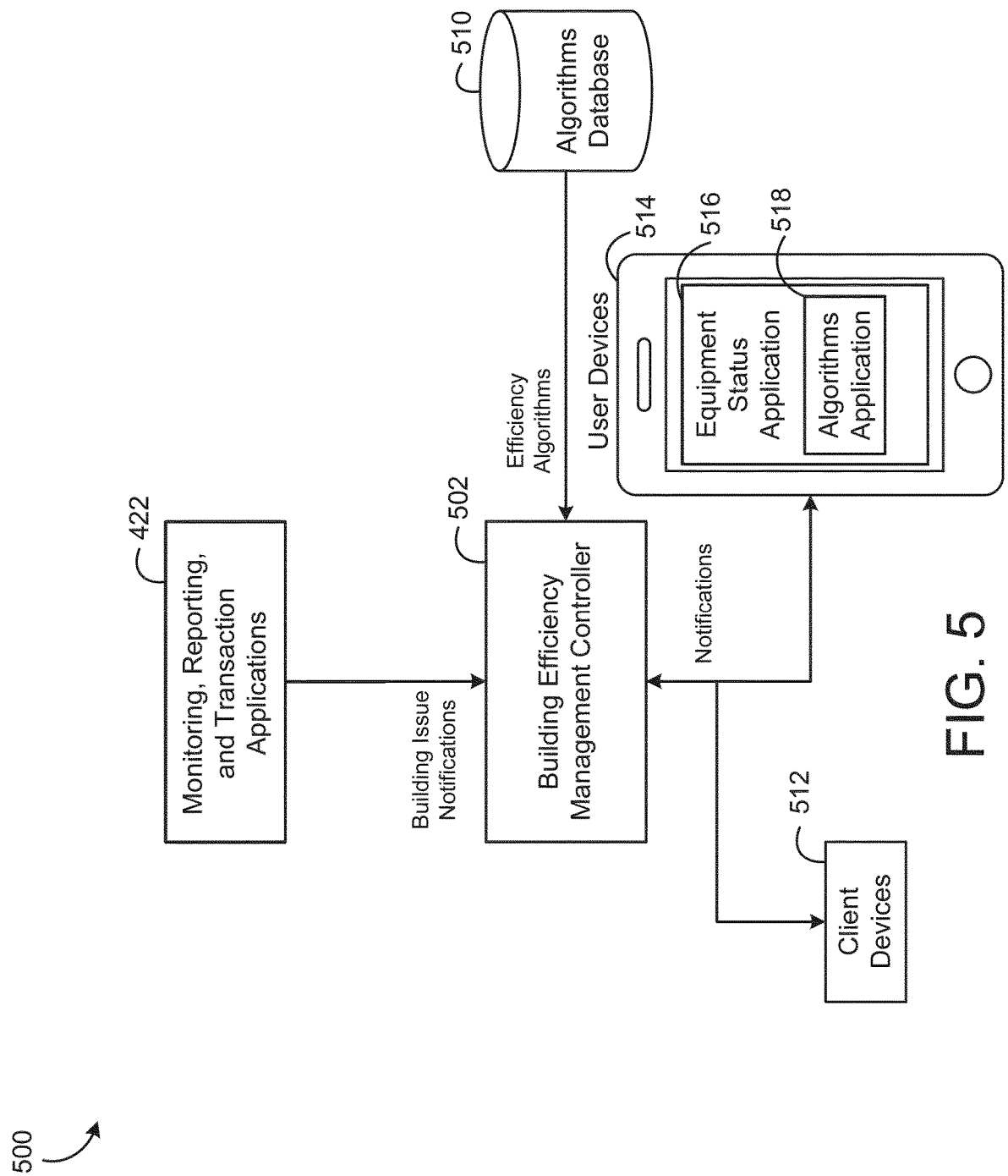
FIG. 5 is high level block diagram of a building efficiency management system, according to some embodiments.

Referring now to FIG. 5, a block diagram of a building efficiency management system 500 is shown in greater detail. More particularly, monitoring and reporting applications 422 of BMS 400 is shown to interface to the building efficiency management system 500. While FIG. 5 describes building efficiency management system 500 in greater detail, it should be understood that BMS 400 and monitoring and reporting applications 422 may further include any number of managers, sub-systems, and modules, and may provide various BMS features for a building or building area beyond what is described in the present disclosure.

Building efficiency management system 500 may generally be configured to received data from BMS 400 and generate an equipment related graphical user interface that can be presented on a user device relating to a BMS. Building efficiency management system 500 comprises a building efficiency management controller 502, one or more monitoring and reporting applications 422, an algorithms database, one or more client devices 512, one or more user devices 514, one or more equipment status applications 516, and one or more algorithm applications 518. As described above, a user may access the graphical user interface via any type of user device 514 to access information about equipment within the BMS.

Building efficiency management system 500 may be configured to collect and analyze data from equipment controlled by the BMS 400, determine the operational status and efficiency level of BMS controlled equipment, generate displays of the operational status and efficiency level of BMS controlled equipment, generate sets of alternative equipment control algorithms based on factors including efficiency objectives, and present users with a set of alternative equipment control algorithms and a means to select and implement an alternate algorithm via the GUI. For example, the content displayed in the interface may be one or more of equipment status as provided by the equipment status application 516 or alternate equipment algorithms as provided by the algorithms application 518. The layout of the information on the interface may be varied based on the type of user device 514 being used to view the information, and the like.

Building efficiency management controller 502 is generally be configured to generate notifications and transmit notifications to client devices 512 and user devices 514. Notifications from building efficiency management controller 502 may include one or more of equipment status notifications, equipment optimal performance notifications, or equipment issue notifications. Notifications from building efficiency management controller 502 may further include one of more of alternate control algorithm recommendations or alternate control algorithm implementation commands.

Figure 6:
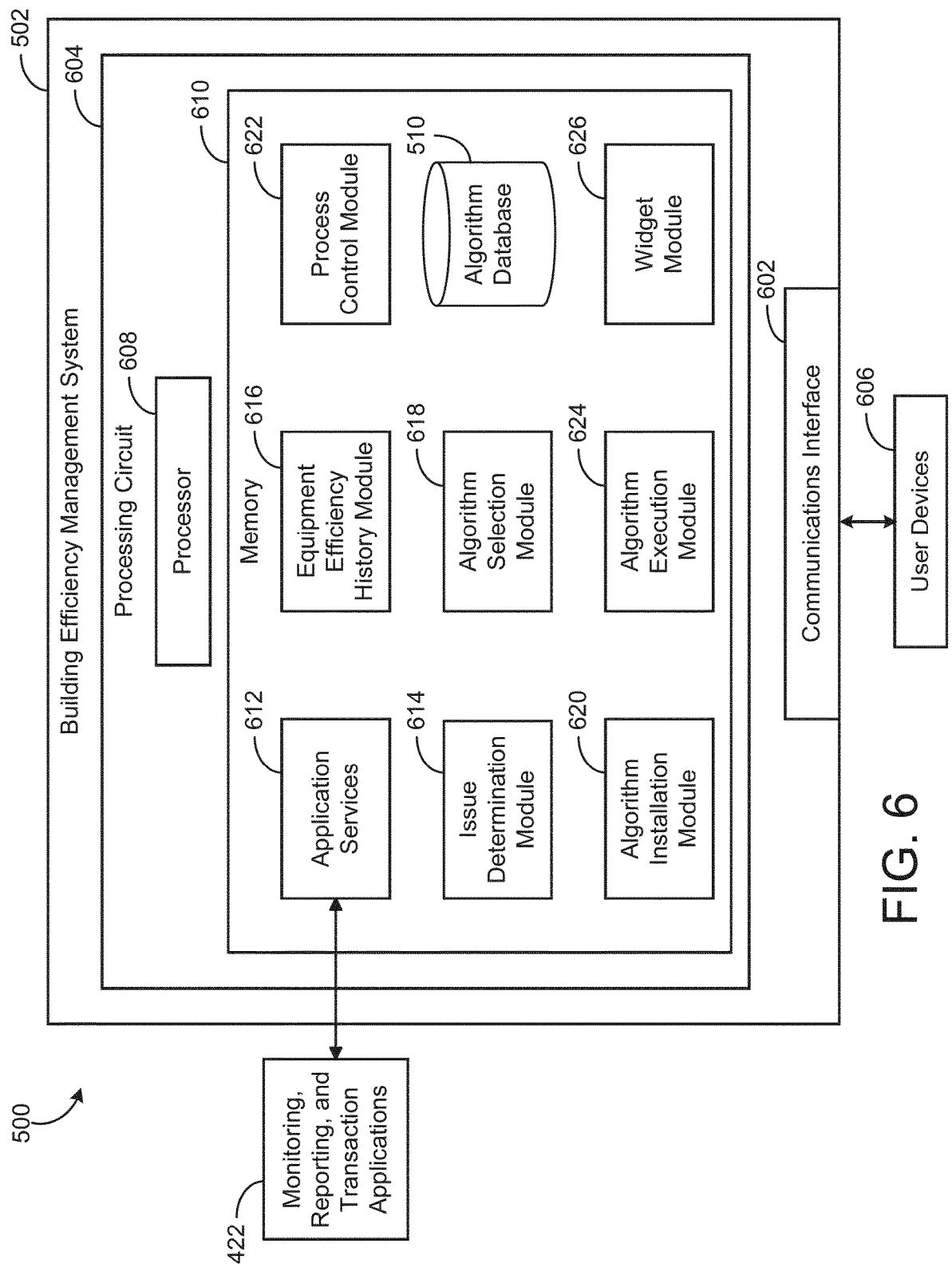
FIG. 6 is a block diagram of a building efficiency management system.

Referring now to FIG. 6, a block diagram of a building efficiency management controller 502 is shown in greater detail. Building efficiency management controller 502 may comprise a processing circuit 604 and a communications interface 602. Processing circuit 604 may further comprise a processor 608 and memory 610. Memory 610 may further comprise one or more application services 612, an issue determination module 614, an equipment efficiency history module 616, an algorithm selection module 618, an algorithm installation module 620, a process control module 622, an algorithm execution module 624, and an algorithm database 510.

Memory 610 includes one or more application services 612. The one or more application services 612 are configured to interface to BMS monitoring and reporting applications 422. Memory 610 may be configured to receive, send, and store fault data from or to FDD layer 416 via monitoring and reporting applications 422. The one or more application services 612 are further configured to receive equipment status data from one or more BMS equipment units. Equipment status data received by the one or more application services 612 may include one or more equipment performance parameters (e.g. revolutions per minute, air volume, voltage, inlet temperature, outlet temperature).

Memory 610 further includes an issue determination module 614. Issue determination module 614 analyzes equipment status data from one or more BMS equipment units to determine if one or more equipment performance parameters correspond to parameters associated with one or more issue conditions or to parameters associated with one or more optimal performance conditions. Issue determination module 614 determines the existence of an issue condition or an optimal performance condition based on historic equipment efficiency data stored in an equipment efficiency history module 616. Equipment efficiency history module 616 is configured to receive and analyze BMS equipment performance data over time. Equipment efficiency history module 616 is further configured to determine whether current BMS equipment performance data is inside or outside a range of efficiency parameters for one or more of an equipment specification based efficiency model or an historic performance data based efficiency model or a blend of models. Equipment efficiency history module 616 is further configured to generate user device 606 notifications based on a determination of whether current BMS equipment performance data is inside or outside the applicable range of efficiency parameters.

Memory module 610 further includes an algorithm selection module 618. Algorithm selection module 618 is configured to analyze notifications generated by equipment efficiency history module 616. Algorithm selection module 618 is further configured to identify a current control algorithm controlling a unit of BMS equipment. Algorithm selection module 618 is further configured to compare current control algorithm performance for a unit of BMS equipment with projected performance of one or more alternate control algorithms stored in an algorithm database 510. Algorithm selection module 618 is further configured to generate a set of recommended alternate control algorithms when the performance of the current control algorithm is outside the applicable range of efficiency parameters for a unit of BMS equipment. Algorithm selection module 618 is further configured to transmit an alternate control algorithm recommendation notification to an algorithms application 518 stored on user device 514. The alternate control algorithm recommendation notification may include one or more of text or graphics. The alternate control algorithm recommendation notification may further include one or more one or more of algorithm name, algorithm description, effects of algorithm on unit of equipment, expected changes efficiency performance of equipment as a result of algorithm change, user recommendations for alternate algorithm, number of alternate algorithm users, number of users who have implemented change to alternate algorithm, cost of alternate algorithm implementation, or projected cost savings of alternate algorithm implementation.

Memory 610 includes a widget module 626. Widget module 626 may be configured to store, create, and/or generate graphic user interface elements, commonly referred to as widgets. Each widget can provide information relating to a particular space in a building, a particular system or sub-system, a particular piece of equipment, an equipment status, an equipment issue, an equipment control algorithm, or equipment operational efficiencies. For example, a widget may relate to a specific HVAC system. As another example, a widget may relate to an HVAC sub-system control algorithm, either for a whole building or for one or more spaces within the building. As another example, a widget may relate to a command to implement an alternate equipment control algorithm.

Widgets can present information relating to a current operating status of a system, accept a user input relating to a change in operation of a piece of equipment or sub-system, present a report with data relating to previous operation of a piece of equipment or sub-system, present a schedule relating to operation of a sub-system, or provide alarms or warnings to a user. For example, widgets associated with an HVAC system may present a current operational parameter, a range of optimal performance parameters or historic equipment performance data. A widget may also allow a user to view information on system or equipment efficiency, recommendations for changes to equipment control algorithms to improve efficiency, projected cost savings resulting from various control algorithm changes, and the like. It should be understood that widgets may generally present any type of information relating to the operation of any equipment or sub-system in a BMS, over any type of area within a building.

An administrator, when creating or modifying a user interface, can choose one or more widgets to be displayed on the user interface. As an example, the administrator may identify one or more graphics, equipment relationships, equipment data, and/or equipment control widgets associated with a type of equipment and assign to the equipment type the user interface layout based on widgets identified by the administrator.

In some embodiments, the administrator can identify a piece of equipment. Widget module 626 may then identify all widgets that may be related to the piece of equipment. For example, the administrator may identify a chiller of an HVAC system for which a particular user is responsible for maintaining or supervising. Widget module 626 may identify one or more widgets related to the chiller and HVAC system that may be relevant to the user. The administrator can then select the widget to be displayed on a user interface for the user, or widget module 626 may assign the widget to the user.

In general, widget module 626 is configured to facilitate the process generating user interfaces for performance data, efficiency related data, equipment relationships, control strategy, control algorithm implementation, and associated transactions. The administrator may provide any type of input to widget module 626 to facilitate the GUI generation process.

Figure 7:
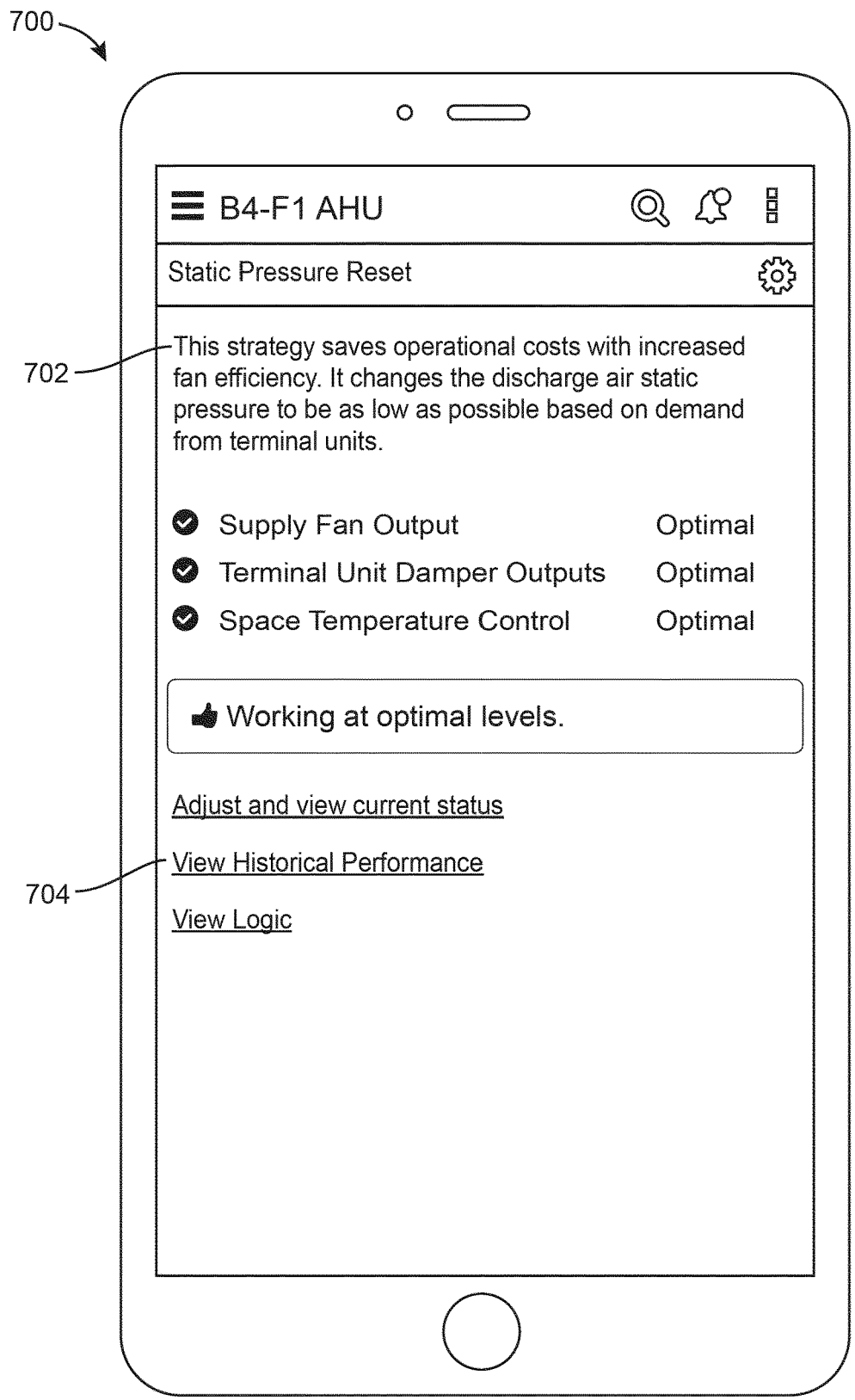
FIG. 7 is a drawing of graphic user interface displayed on a user interface device, according to some embodiments.

Referring now to FIGS. 7-10, example layouts that can be generated by widget module 626 are illustrated. Referring to FIG. 7, an example mobile device layout 700 for a particular item of equipment is shown. The example layout illustrated demonstrates the display for a particular item of equipment of a widget based representation of the designation of the current control strategy, a brief description of the strategy 702, status of operational metrics of the equipment, overall operational efficiency of the item of equipment, and links 704 to widgets for adjustments to status, historical performance, and logic.

Figure 8:
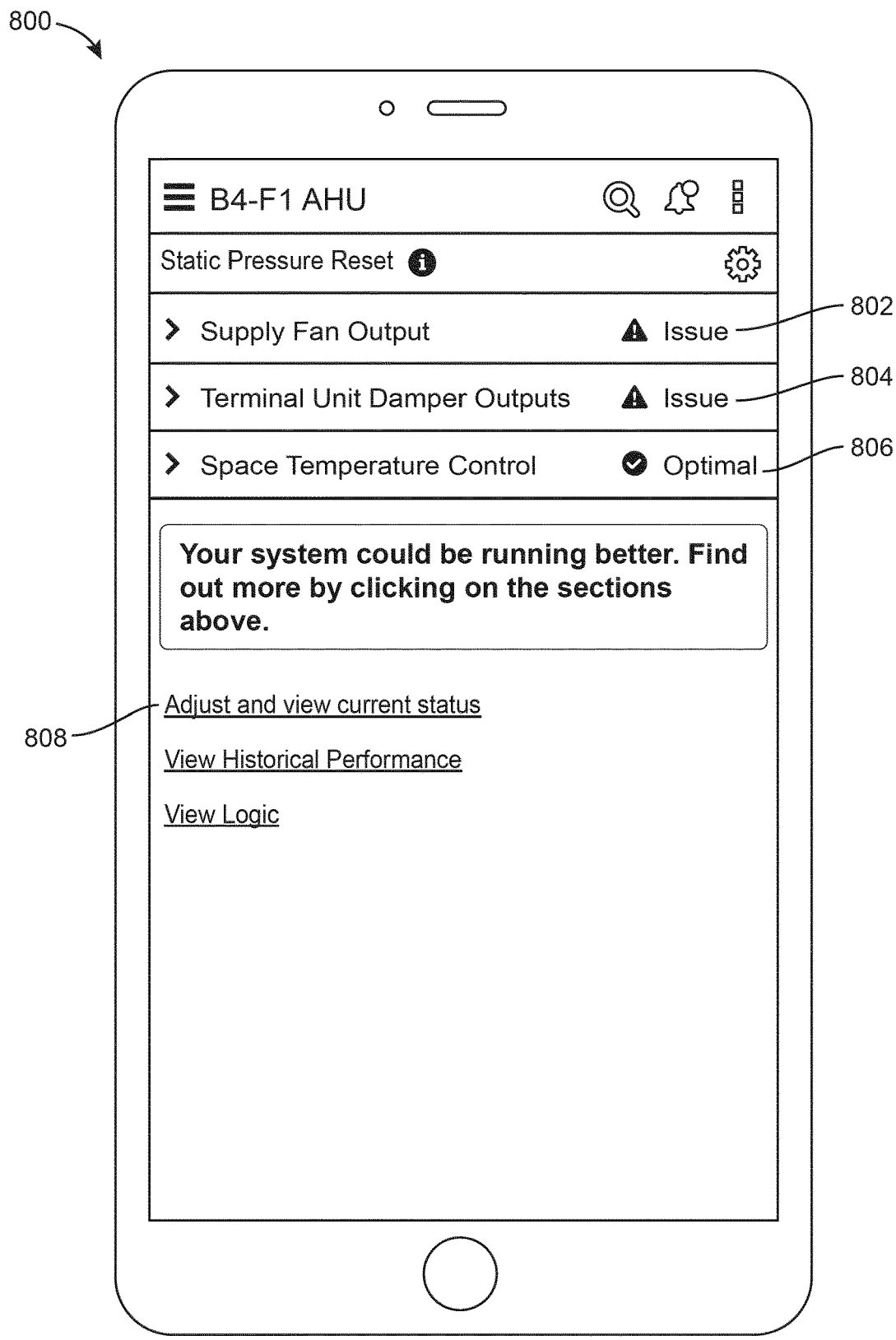
FIG. 8 is a drawing of a building efficiency management system graphic user interface with efficiency issue message displayed on a user interface device, according to some embodiments.

Referring to FIG. 8, an example mobile device layout 800 for a particular item of equipment is shown. The example layout illustrated demonstrates the display for a particular item of equipment of a widget based representation of non-optimal status for two components of the equipment (e.g. "supply fan output issue" 802, "terminal unit damper outputs issue" 804) contrasted with optimal status for one component ("space temperature control optimal" 806). The links 808 to widgets for adjustments to status, historical performance, and logic remain available to the user in this layout.

Figure 9:
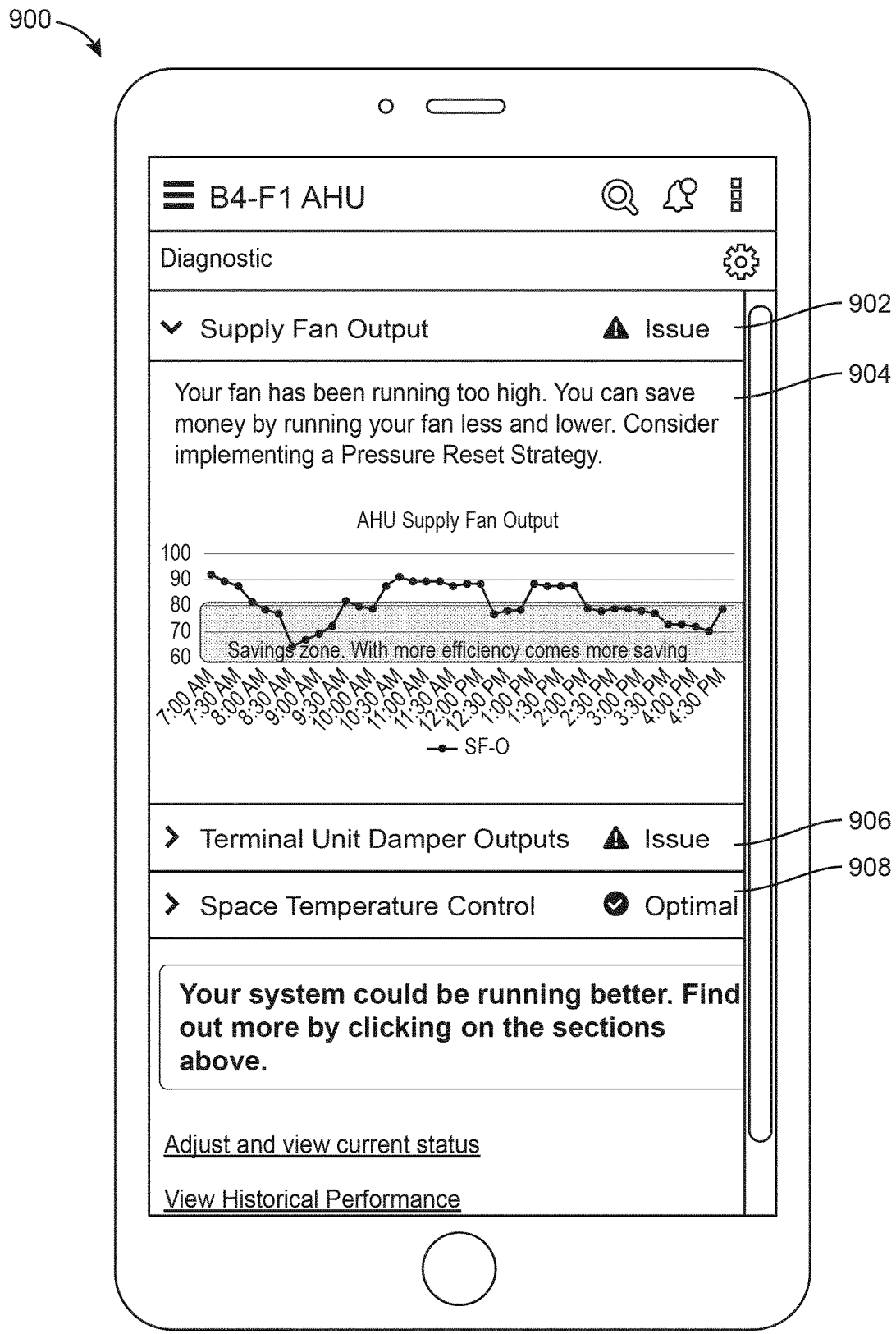
FIG. 9 is a drawing of a building efficiency management system graphic user interface for a diagnostic application displayed on a user interface device, according to some embodiments.

Referring to FIG. 9, an example mobile device layout 900 for a particular item of equipment following user selection of a drop down view is shown. Issue diagnosis 902 may be provided to the user via the GUI through both a textual description 904 of the issue and a graphic depiction of equipment performance over time including an indication of optimum performance range for the particular component or equipment.

Figure 10:
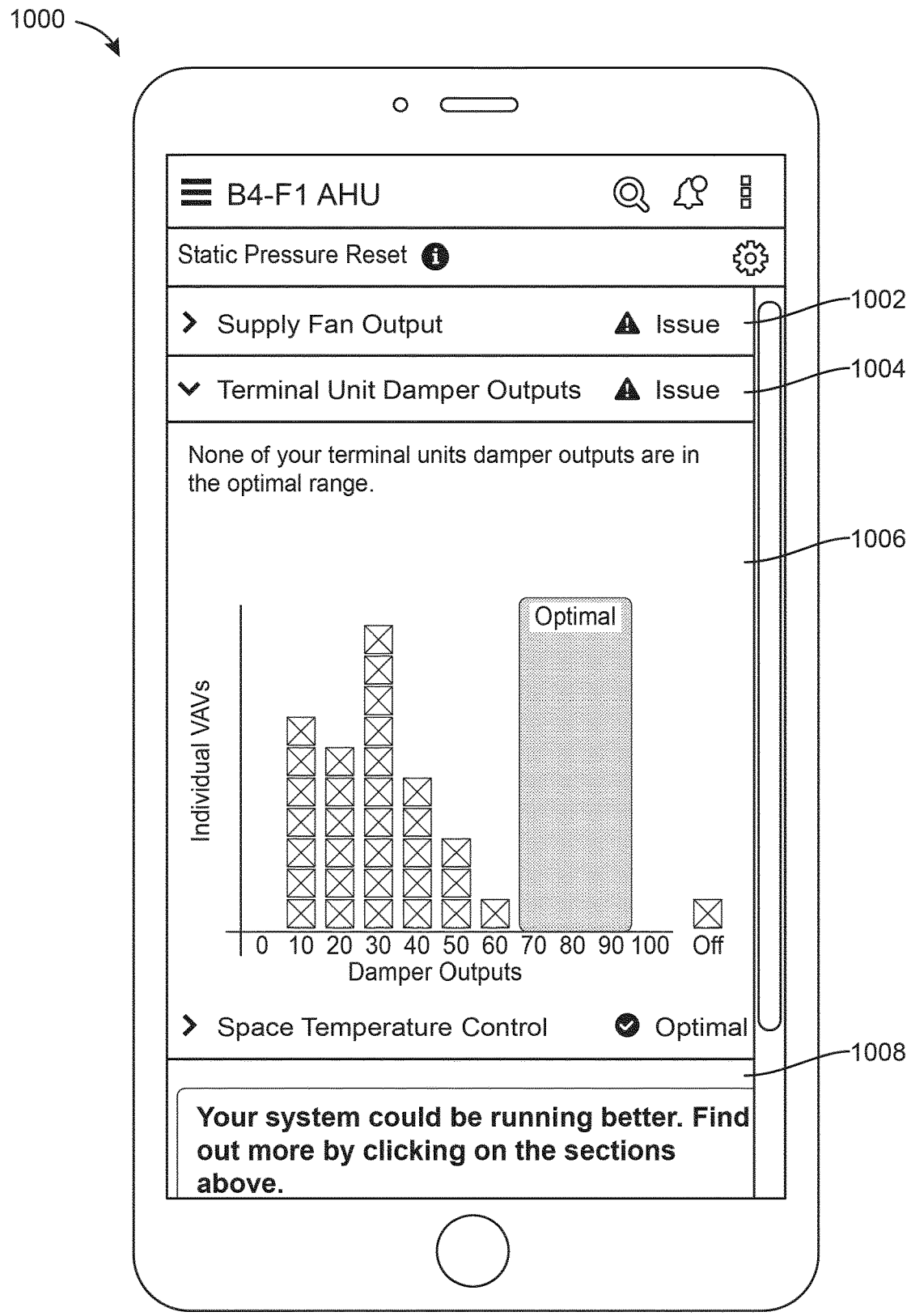
FIG. 10 is another drawing of a user interface for a diagnostic application displayed on a user interface device, according to some embodiments.

Referring to FIG. 10, an alternate example mobile device layout 1000 for a different component 1004 following user selection of a drop down view is shown. Issue diagnosis 1004 may be provided to the user via the GUI through both a textual description of the issue and a graphic depiction of equipment performance 1006 over time including an indication of optimum performance range for the particular component or equipment.

Figure 11:
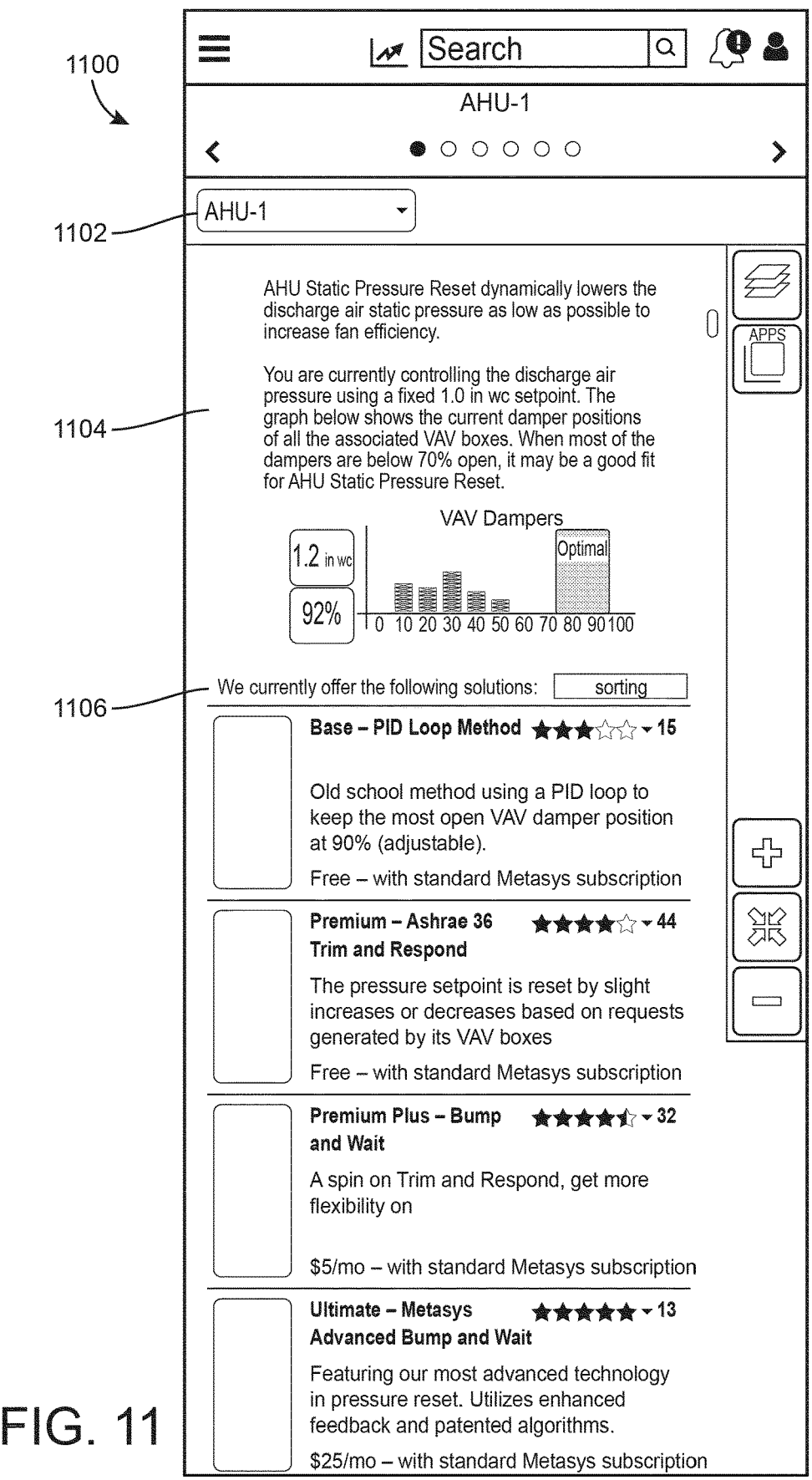
FIG. 11 is an drawing of a user interface for displaying equipment status and selecting an alternate equipment control algorithm, according to some embodiments

Referring to FIG. 11, an alternate example mobile device layout 1100 for which the user has selected a display of recommendations for corrective action following a performance issue notification. The layout 1100 shows the target item of equipment 1102 (e.g. AHU-1). Issue diagnosis 1104 may be provided to the user via the GUI through both a textual description of the issue and a graphic depiction of equipment performance over time including an indication of optimum performance range for the particular equipment. Recommendations for solutions 1106 to the issue may be presented. In the corrective action layout, the user device hosted applications may display one or more of issue description and depiction, alternate control algorithm recommendations, alternate control algorithm name and description, effects of alternate control algorithm on unit of equipment, expected changes efficiency performance of equipment as a result of algorithm change, user recommendations rating for alternate algorithm, number of alternate algorithm users who rated the algorithm, number of users who have implemented change to alternate algorithm, cost of alternate algorithm implementation, or projected cost savings of alternate algorithm implementation. The user interface may receive a command from a user to display additional information about a selected alternate control algorithm displayed in the user interface. Additional information may include, for example, individual user feedback on the selected alternate control algorithm, a detailed description of the selected alternate control algorithm, information on equipment operational efficiency improvements resulting from a command to implement the selected alternate control algorithm.

Configuration Interfaces

Figure 12:
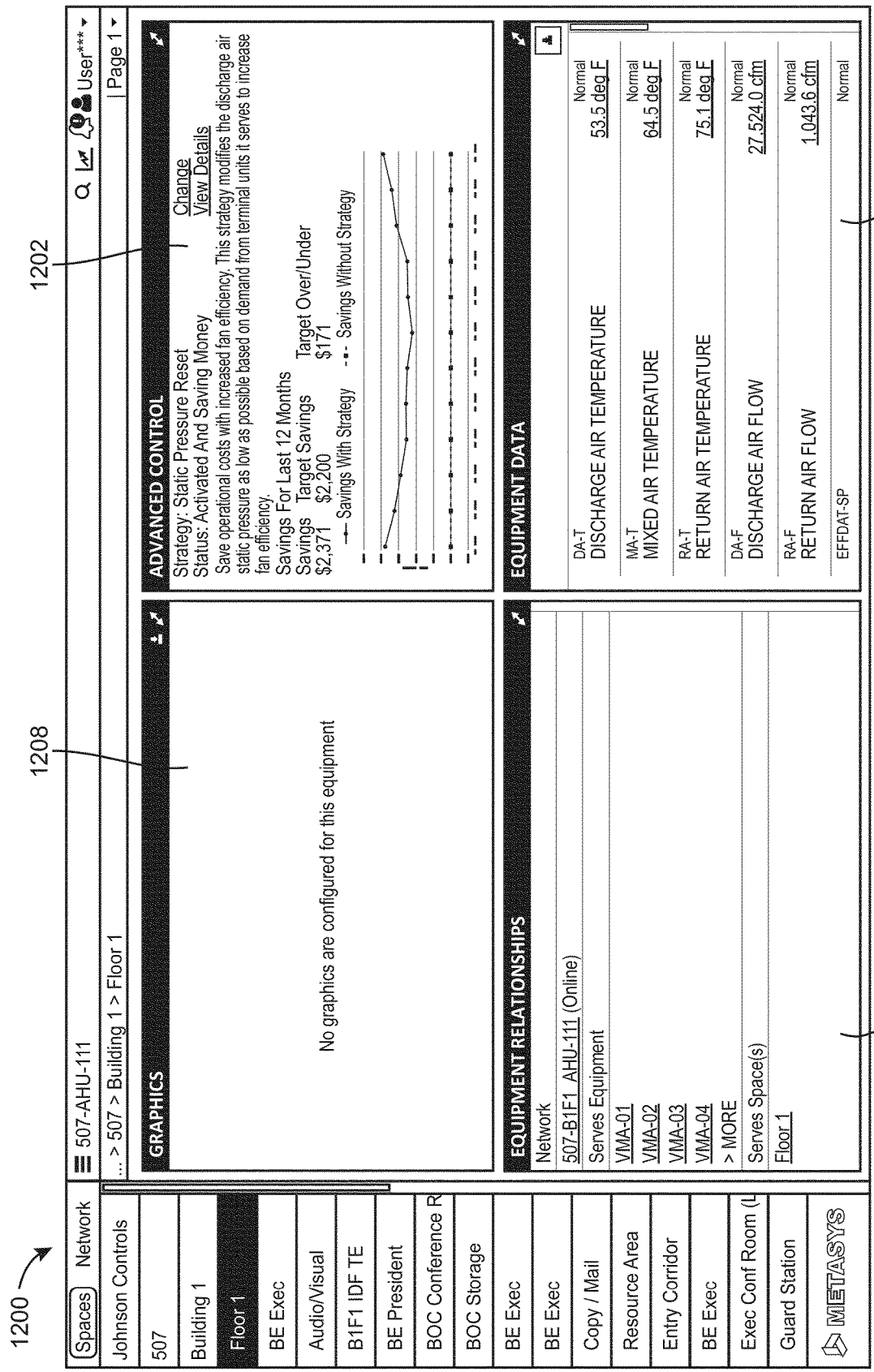
FIG. 12 is drawing of a configuration interface to create a user interface for displaying equipment status and selecting an alternate equipment control algorithm, according to some embodiments
Figure 13:
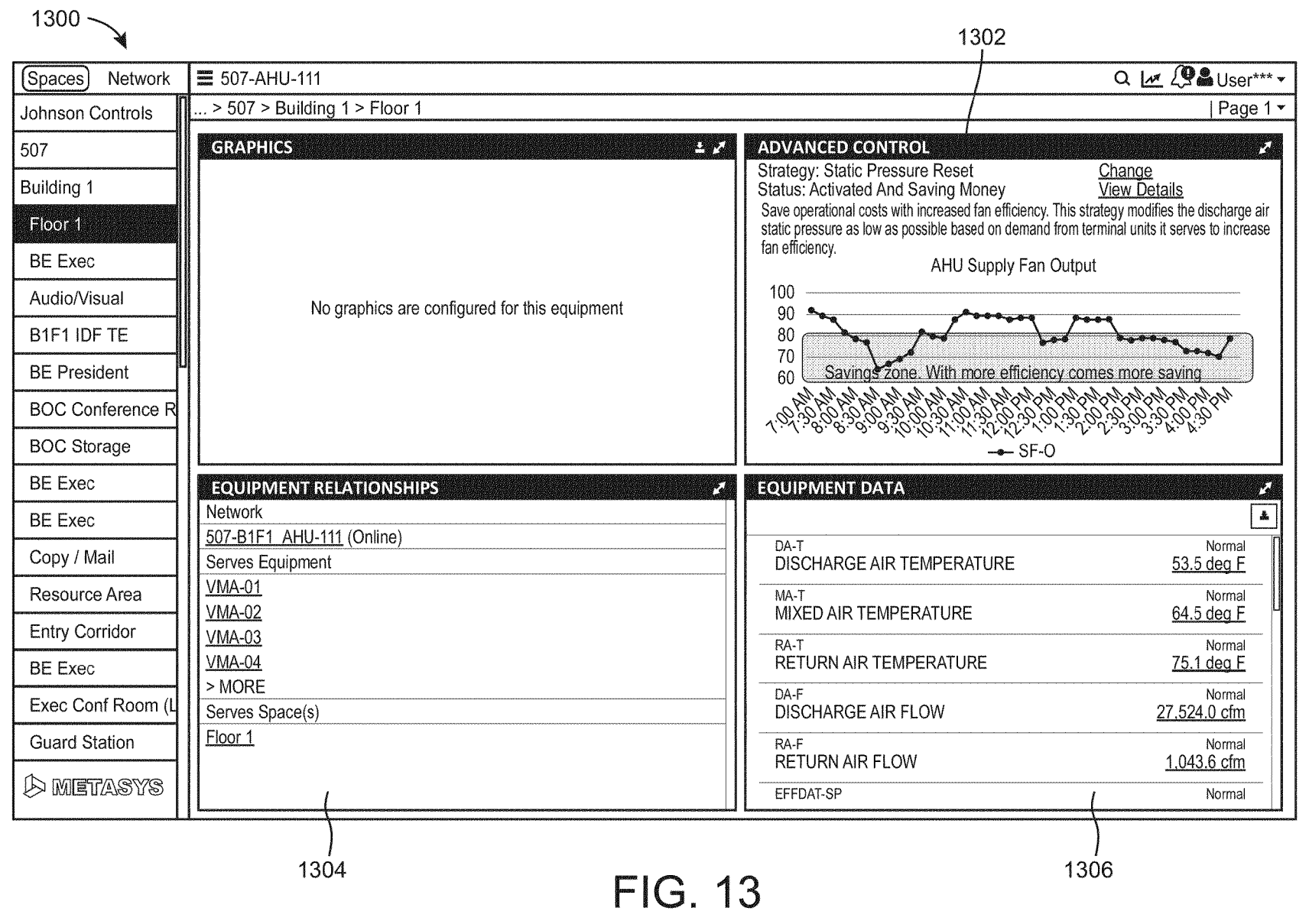
Figure 14:
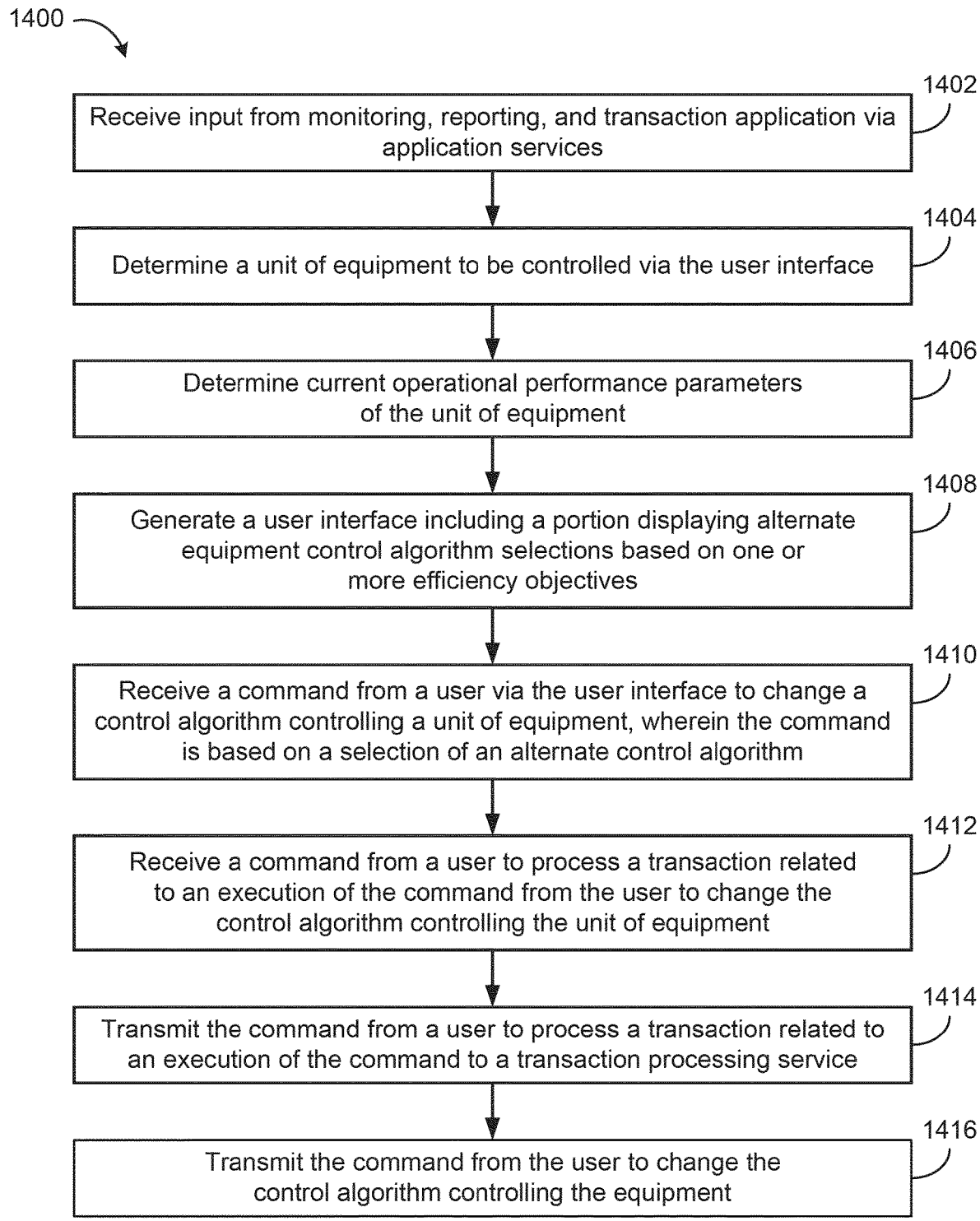
FIG. 14 is a flow diagram of a process for generating a building management system efficiency improvement user interface for displaying equipment efficiency status and commanding equipment control changes.

As described above, an administrator may create and modify a user interface to be presented for a user, including providing various parameters related to the widgets to be presented within the user interface and the content in each widget. The widget module 626 may be configured to provide a configuration interface for allowing the administrator or create and modify the user interface. Referring generally to FIGS. 12-13, example configuration interfaces that can be presented to an administrator are illustrated.

Referring to FIG. 12, an example configuration interface 1200 is described in greater detail. In the embodiment of FIG. 12, configuration interface 1200 is shown to include a section 1202 for configuration of advanced control widgets, a section 1206 for configuration of equipment data widgets, a section 1204 for configuration of equipment relationships, and a section 1208 for configuration of graphics for selected equipment.

In section 1202, the administrator can configure one or more widgets to display current equipment control strategy, current strategy status, descriptions of control strategy function and efficiencies associated with particular control strategies, alternate control strategy recommendations, target cost savings, accept user commands to change control strategies, calculate cost savings over time with and without implementation of one or more alternate control strategies, and generate graphic depictions related to current equipment performance metrics.

In section 1204, the administrator can select from one or more menus related to equipment relationship within a BMS. As shown in FIG. 11, the menu items available for association may include one or more of networks, individual items of equipment, or spaces. Section 1104 can further provide information on the status of menu items.

In section 1206, the administrator can select from a range of equipment performance data for individual items of equipment. For example where the equipment is an air handling unit within the BMS, equipment data may include discharge air temperature, mixed air temperature, return air temperature, and the like. As shown in FIG. 12, the data displayed to the user in the equipment data widget can characterize the current status of the measured performance parameter (e.g. "normal" or "issue").

Referring to FIG. 13, in configuration interface 1300, the administrator is shown, for example, to have selected a graphic depiction of equipment performance over time for section 1302 in place of the graphic depiction of cost savings over time presented in section 1202. It should be understood that configuration interface 1200 may further include any number of controls, icons, buttons, and the like that allows the administrator to add, remove, reposition, and resize widgets in the layout in any way.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A non-transitory computer readable storage media comprising an application for use in a building management system comprising building equipment configured to serve a space in a building or campus, wherein a user device is configured to display a user interface for monitoring and controlling the building equipment and the space, the application comprising instructions stored on the non-transitory computer readable storage media that when executed by a processor cause the processor to:
   generate a user interface view including a portion displaying alternate equipment control algorithm selections for a unit of building equipment based on one or more efficiency objectives;

receive a command from a user via the user interface to change a control algorithm controlling building equipment, where in the command is based on a selection by the user of an alternate control algorithm displayed via the user interface but not currently installed on the building management system;

transmit the command from the user to change the control algorithm controlling building equipment, the command causing the building management system to download the alternate control algorithm from an algorithms database and install the alternate control algorithm on the building management system; and receive a command from the user to process a transaction related to the command from the user to change the control algorithm controlling building equipment, wherein the user interface further includes a portion displaying one or more attributes of the equipment control algorithm selections, wherein the one or more attributes comprise a cost to implement a change to the control algorithm controlling building equipment, expected changes efficiency performance of the building equipment as a result of the change to the control algorithm, projected cost savings as a result of the change to the control algorithm, or a rating of the control algorithm.

2. The non-transitory computer readable storage media of claim 1, wherein the one or more attributes include an algorithm name and an algorithm description.

3. The non-transitory computer readable storage media of claim 1, wherein the application is further configured to:
determine a range of efficient operational performance of a building equipment unit;
determine whether a current operational performance parameter of the building equipment unit is within or not within the range of efficient operational performance;
generate a user notification that the current operational performance parameter of the building equipment unit is inside or outside the range of efficient operational performance.

4. The non-transitory computer readable storage media of claim 1, wherein the application is communicably connected to a transaction processing service, wherein the transaction processing service processes the transaction related the command from the user to change the control algorithm controlling building equipment.

5. The non-transitory computer readable storage media of claim 1, wherein the building equipment comprises heating, ventilation, and air conditioning (HVAC) devices.

6. The non-transitory computer readable storage media of claim 1, wherein the space in the building or campus comprises one of a room, multiple rooms, a floor level, the building, or multiple buildings.

7. A building equipment system comprising:
building equipment configured to serve one or more spaces in a building or campus; and
a user device configured to communicate with the building equipment and provide a user interface, the user interface configured to:
generate a user interface view including a portion displaying a plurality of alternate equipment control algorithm selections for a building equipment unit based on one or more efficiency objectives;
receive a command from a user via the user interface to change a control algorithm controlling the building equipment unit, where in the command is based on a selection of an alternate control algorithm displayed via the user interface but not currently installed on the building equipment system;

transmit the command from the user to change the control algorithm controlling the building equipment unit, the command causing the building equipment system to download the alternate control algorithm from an algorithms database and install the alternate control algorithm on the building equipment system; and receive a command from the user to process a transaction related to the command from the user to change the control algorithm controlling the building equipment unit, wherein the user interface further comprises a portion displaying one or more attributes of the equipment control algorithm selections, wherein the one or more attributes comprise a cost to implement a change to the control algorithm controlling building equipment, expected changes efficiency performance of the building equipment as a result of the change to the control algorithm, projected cost savings as a result of the change to the control algorithm, or a rating of the control algorithm.

8. The building equipment system of claim 7, wherein the user interface is configured to receive and analyze building equipment performance data for efficiency improvements related to the change of a control algorithm controlling building equipment unit.

9. The building equipment system of claim 7, wherein the user interface is further configured to determine whether each parameter of a plurality of equipment current performance parameters is inside or outside a range of efficiency parameters of an efficiency model.

10. The building equipment system of claim 7, wherein the user interface is further configured to generate one or more user device notifications based on a determination of whether one of more current performance parameters of a unit of equipment is inside or outside a range of efficiency parameters.

11. The building equipment system of claim 7, wherein the one or more attributes include an algorithm name and an algorithm description.

12. The building equipment system of claim 7, wherein the transaction related to the command from the user is a purchase transaction.

13. The building equipment system of claim 7, wherein the user device comprises one of a workstation, a desktop, a laptop, a tablet, and a mobile device.

14. The building equipment system of claim 7, wherein the user interface is configured to present a menu to the user comprising one of more of a list of alternate equipment control algorithms, a ranking of alternate equipment control algorithms.

15. The building equipment system of claim 7, wherein the user interface is further configured to receive one or more configuration inputs from an administrative user, the inputs comprising at least one of:
a depiction of a unit of equipment;
a relationship between at least two building system components;
an equipment data set; and
an equipment control scheme.

16. The building equipment system of claim 15, wherein the one or more inputs from the administrative user relate to generation of a plurality of user views, the plurality of user views being configurable by the administrative user.

17. The building equipment system of claim 15, wherein the user interface may be configured to generate a user interface comprising a means to display one or more transaction selections to the user and accept a user command to execute the transaction.

18. The building equipment system of claim 7, wherein a subsystem is a heating, venting, and air conditioning (HVAC) system.

19. A method for implementing a building equipment efficiency improvement system comprising:
   generating a user interface including a portion displaying alternate equipment control algorithm selections based on one or more efficiency objectives;
   receiving a command from a user via the user interface to change a control algorithm controlling a building equipment system, where in the command is based on a selection of an alternate control algorithm displayed via the user interface but not currently installed on the building equipment system;
   receiving a command from the user to process a transaction related to an execution of the command from the user to change the control algorithm controlling the building equipment system, the command causing the building equipment system to download the alternate control algorithm from an algorithms database and install the alternate control algorithm on the building equipment system; and
   transmitting the command from the user to process a transaction related to an execution of the command to a transaction processing service, wherein the user interface further comprises a portion displaying one or more attributes of the equipment control algorithm selections, wherein the one or more attributes comprise a cost to implement a change to the control algorithm controlling building equipment, expected changes efficiency performance of the building equipment as a result of the change to the control algorithm, projected cost savings as a result of the change to the control algorithm, or a rating of the control algorithm.

20. The method of claim 19, wherein the one or more attributes include an algorithm name and an algorithm description.

* * * * *